United States Patent [19]
Schriever

[11] 3,771,773
[45] Nov. 13, 1973

[54] METHOD OF AND DEVICE FOR INTERMIXING TWO OR MORE COMPONENTS TO MAKE UP A SUBSTANCE, ESPECIALLY FOR DENTISTRY

[76] Inventor: Karl-A. Schriever, Arnoldstrasse 56, Hamburg, Germany

[22] Filed: Nov. 30, 1971

[21] Appl. No.: 203,207

[52] U.S. Cl. ............................... 259/185, 259/72
[51] Int. Cl. .............................................. B29b 1/08
[58] Field of Search .................. 259/185, 188, 72, 259/182, 1

[56] References Cited
UNITED STATES PATENTS
2,539,457  1/1951  Metheny .............................. 259/72
3,332,670  7/1967  Swartz ................................. 259/72
3,543,966  12/1970  Ryan .................................. 259/72

Primary Examiner—Robert W. Jenkins
Attorney—Walter Becker

[57] ABSTRACT

A method of and arrangement for intermixing two or more components according to which the components or at least some of them are in measured quantities contained in separate thin bags arranged within and connected to a hose-shaped container which is subjected to pressure sufficient to break the bags while the hose-shaped container which does not break at this pressure is worked to cause the contents of the broken bags to intermix.

7 Claims, 3 Drawing Figures

PATENTED NOV 13 1973                    3,771,773

METHOD OF AND DEVICE FOR INTERMIXING TWO OR MORE COMPONENTS TO MAKE UP A SUBSTANCE, ESPECIALLY FOR DENTISTRY

The present invention relates to a method of and device for mixing a material with two or more components, especially for making imprints or impressions of palates and teeth. For purposes of making an imprint of certain parts of the body, for instance of a palate and of teeth for making dentures and duplication molds, it is known to use silicon rubber, plaster of Paris, alginates and similar materials. Heretofore it was necessary to intermix such imprint masses in an awkward manner with one or more materials. The mixing was carried out by agitating mechanism or in dentistry in most instances on a mixing plate or in a cup by means of an agitating spoon. Various dosing systems and mixing methods are known.

It is, therefore, an object of the present invention to render superfluous the heretofore customary and awkward mixing operation so as to eliminate the mixing and the cleaning of mixing plates and vessels while at the same time making the mixing more precise and thereby permitting a better calculation and control of the processing time and the time of solidification of such imprint material.

Figure 1:
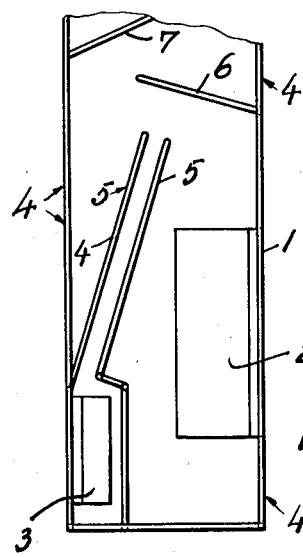

These and other objects and advantages of the invention will appear more clearly from the following specification in connection with the accompanying drawing, in which:

FIG. 1 diagrammatically illustrates one embodiment of the mixing arrangement according to the invention.

Figure 2:
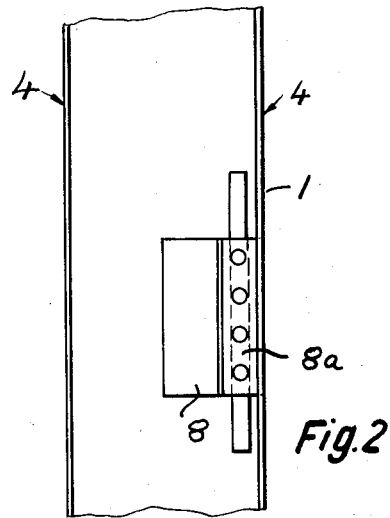

FIG. 2 shows a specific example of connecting a bag of metal foil to the seam of the hose.

Figure 3:
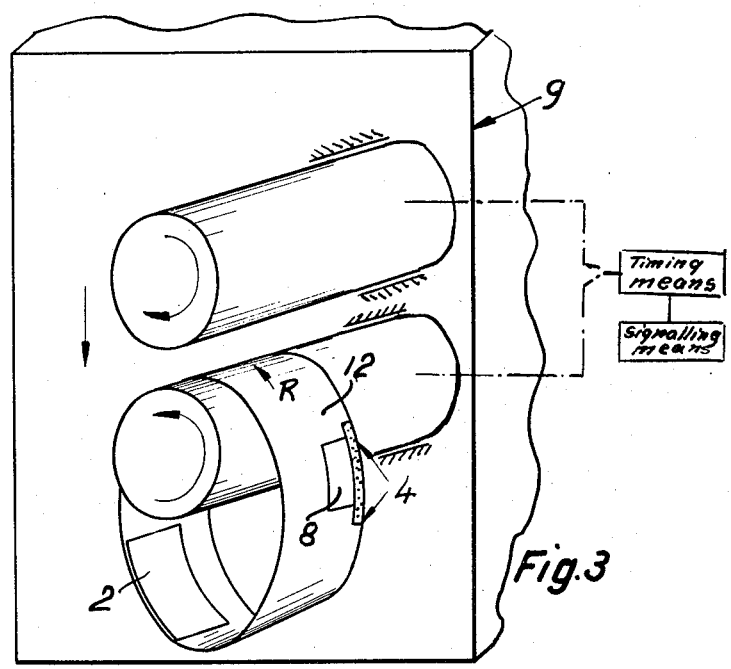

FIG. 3 diagrammatically illustrates another method and device for mixing various components for the purpose involved in the present case.

The main field of application of the present invention concerns silicon rubber imprint masses for dentistry use. The hardener for the silicon rubber is introduced into a small bag while closing off the air. Particularly advantageous has proved the fusing of the hardener in a bag of polyethylene foil which has a thickness of approximately 0.02 mm and from which by tempering or chemical treatment the moisture which may amount up to 6 percent has been withdrawn. Inasmuch as silicon rubber hardeners react highly hygroscopically and chrystallize already due to the moisture in the air, it is necessary to protect a hardener fused in a polyethylene bag against moisture by providing the polyethylene bags with a water repellant liquor or oil. For this purpose, silicon oil has proved most satisfactory. The silicon imprint mass or material can, similar to the hardener, be placed into thin polyethylene bags.

According to the present invention, the components of the imprint material are introduced into a hose of substantially 60 cm length. When lying flat, the hose has a width of approximately from 4.5 to 6 cm. As hose there may be employed a polyethylene foil of a suitable strength or thickness. The bag containing the silicon imprint material and the bag containing the silicon hardener must expediently have a polyethylene flag or flap which is connected to the start of the hose. The connection is expediently effected during and together with the fusing of the hose seam.

The polyethylene hose is, after insertion and mounting or connection of the bags containing the imprint materials, unilaterally fused. Thereupon the thus fused hose is placed adjacent a double roller. When the roller gets hold of the hose, due to the rolling action, the thin bags will burst or break open and thus free the imprint materials therein. Furthermore, in view of the rolling action of the rollers, the individual imprint materials are pressed through the entire hose so as to intermix.

In order to assure a good intermixing of the components, the interior of the polyethylene hose may be provided with certain obstructions which force the mixture to move along certain paths and through constrictions so that a better intermixing of the individual components will be assured. In the polyethylene hose, by means of a definite or certain fusing system, a channel system can be obtained. In this connection it is expedient to take into consideration that the hardener liquid is during the squeezing of the materials through the hose ahead of the paste to be admixed, for instance ahead of the silicon rubber, inasmuch as in this way a better intermixing will be assured.

According to a further development of the invention, the polyethylene hose may be made endless, in other words may have the configuration of a ring. Such a ring with the components for the respective imprint materials therein need have only a diameter of 20 cm, and the mixing operation in the hose may take any desired time. Expediently, for mixing the materials in such an annular hose, a double roller is employed. The rollers are journalled at one end only in a cantilever fashion so as to permit the insertion and removal of the hose. Furthermore, the rollers must be so arranged that the bite therebetween can be varied. For the mixing operation proper it is necessary to press the rollers together. For purposes of simplifying the operation, it is, of course, also possible to place the hose on a plane surface and apply a squeezing roller similar to a dough rolling pin in order to bring about the bursting of the bags containing the components of the imprint material and to effect the intermixing of the components. However, experience has shown that the double roller system is preferable.

The method according to the present invention results in various advantages. The dosing is effected during the fabrication of the bags in the factory so that later errors are excluded. In contrast to the intermixing of the imprint materials with a manually operated spoon according to the heretofore known practice, with the method according to the present invention no variations occur with regard to the pot time and the vulcanizing time because a roller mill runs uniformly and therefore carries out the mixing operation uniformly. In contrast thereto, all manually effected mixing or agitating operations take place at varying speeds. However, the mixing time and the mixing intensity determine not only the temperature but also the pot and vulcanizing time.

The present invention makes it possible for the first time by means of a specifically designed small rolling mill to carry out the mixing operation automatically and with utmost precision inasmuch as it is possible to control the rolling mill precisely by a timing mechanism. Such timing mechanism can be designed so as to give off an acoustic signal to indicate when the potting time begins and when the imprint paste or material is ready for use, i.e. has to be placed into the mouth or on any other part of the body to be copied. The hardening time can be predicted and can likewise be indicated by the same timing mechanism, for instance acoustically. In this connection it is, of course, to be taken into consideration whether the imprint is to be effected in the mouth where the heat of the mouth has an accelerating effect, or whether the imprint is to be effected at another part of the body or an object having different temperatures.

The method according to the present invention will, for all practical purposes, exclude the admixing of air and will prevent that during the mixing of the silicon rubber imprint mass water is absorbed by the hardener.

After the rolling - mixing operation is completed, the polyethylene hose is withdrawn from the rolling mill and cut open. The mixture can then manually be squeezed out of the hose by the dentist onto the imprint spoon or onto the part to be copied.

The method according to the present invention is preferably employed for silicon rubber imprint material. However, it may also in the same manner be used for other imprint materials, such as alginates, in which instance the dosed water is enclosed in a thin fused bag. The method according to the invention may also be employed for other imprint materials, such as plaster of Paris, and for certain cements which are to be intermixed with acids, as for instance silicate and phosphate cements, or polyester multicomponent resins for the building up of structures or for cementing.

Silicon rubber is according to this new method also used for and admixed to the lining of dentures, if the lining is to remain soft.

In connection with most of the silicon rubber masses it is necessary to take certain precautions to maintain the catalizing properties of the catalyst for use in the vulcanizing and hardening process in view of the hygroscopic properties of the catalyst. To this end, the hardener may be chemically separated into two components in such a way that the individual components of the hardener by themselves no longer act hygroscopically, which means no longer attract moisture through the polyethylene bag.

According to another possibility, the polyethylene bags may be coated with a metallic layer or the bags may be made of metallic vapor-covered foil which in most instances can also be fused.

According to still another possibility, for maintaining the capabilities of the hardener, absolutely pure tin may be used. The foil bags of tin have at one or more sides to be provided with a protrusion in the form of a flag or flap. The flap may be provided with perforations stamped out of the foil or with other retaining means. The perforated foil flaps can in a simple manner by fusing with superimposed polyethelene strips be connected to the polyethyelene hose, for instance along the annular seam of the ring-shaped hose. Pure tin is neutral to the silicon hardeners. The bag containing the hardener must be firmly connected to the seam of the hose or the wall of the hose inasmuch as otherwise an intermixing of the components cannot be carried out so well, and moreover there exists the danger that the material of the burst bags will be intermixed by the rollers with the various components to be mixed and pressed through the hose so that the intermixed materials will contain residues of the bags.

Referring now to the drawing in detail, FIG. 1 shows a hose 1 having arranged in its interior and connected thereto a bag 2 filled with imprint material or imprint mass. Furthermore, arranged in the interior of the hose 1 and connected thereto is a bag 3 filled with the hardener or catalyst. The bag 1 may consist, for instance, of synthetic material, such as polyethylene, and its welding seams are indicated by the reference numeral 4. Finally, FIG. 1 shows obstructions 5, 6 and 7 which may be of any desired nature, for instance may consist of a material similar to the material of the hose. These obstructions force the contents freed from the bags 2 and 3 and the intermixed materials to flow through the hose and leave the hose while following a certain path.

FIG. 2 shows an example of how a bag 8 made of metallic foil and containing one of the components to be intermixed may be connected to the hose 1. More specifically, the bag 8 is provided with a flap or flag 8b which has perforations 8b stamped out of the foil. The flap 8a of the bag 8 is interposed between overlapping strips or portions of the hose where the hose seam is formed, and during the fusing of the hose seam material of the hose enters the perforations 8b and thereby connects the flag 8a to the hose 1.

FIG. 3 diagrammatically shows a small rolling mill generally designated 9 which comprises rollers 10 and 11 which are journalled (not shown) at one end only. Moreover, at least one of the rollers, for instance roller 11, is movable relative toward and away from the other roller. As shown in FIG. 3, an endless or annular hose 12 having connected therein bags 2 and 8 is placed over the roller 10. For carrying out the mixing operation in conformity with the present invention, the roller 11 is moved relative to the roller 10 so that the hose 12, while being rotated by the rollers will be squeezed therebetween, and the bags 2 and 8 will burst open and the intermixing of the materials released from said bags will be carried out in the manner described above. After completion of the mixing operation, hose 12 is cut open and the imprint mass is withdrawn from the hose.

As set forth above, the time or duration for operating the rollers 10 and 11 for a certain mixing operation may be controlled in a simple manner by means of any standard timing mechanism. At the end of the set time, any desired kind of signal, for instance an acoustic or optical signal, may be initiated to indicate completion of the mixing operation. Devices of this type are likewise known and may be of any standard kind.

It is, of course, to be understood that the present invention is, by no means, limited to the specific showing in the drawing but also comprises any modifications within the scope of the appended claims.

What I claim is:

1. A method of intermixing at least two components to form a mold substance, especially for use in dentistry, which includes in combination the steps of: enclosing a quantity of at least one of said components separately in thin bag means adapted to break when being subjected to a certain desired kneading pressure, preparing an elastic hose-shaped container stronger than said bag means, firmly securing said bag means in said container, and subjecting said container to a pressing action at a pressure sufficient to break said bag means and to mix the component thereof with another component within said container without breaking the latter.

2. A method in combination according to claim 1, which includes filling said bag means and hose-shaped container with silicone rubber forming components and sealing said bag means and components in a vacuum.

3. A method in combination according to claim 2, which includes the preliminary step of coating said container with a water repellent fluid selected from the group consisting of lacquers and silicone oils.

4. A method in combination according to claim 3, which includes the preliminary step of first dehumidifying the hose-shaped container.

5. An arrangement for intermixing at least two components to form a substance, which includes a hose-shaped container bag means of thin material containing at least one of said components of the substance to be formed and being adapted to break when subjected to a certain desired pressure, said bag means being firmly secured within and to said container, said container being sealed and being of a considerably stronger, flexible material than said bag means so as not to break when subjected to a pressure breaking said bag means, and a plurality of roller means movable relative toward and away from each other for selectively receiving therebetween and working said container.

6. An arrangement according to claim 5, which includes timing means operatively connected to said roller means for controlling the same.

7. An arrangement according to claim 6, which includes signalling means operatively connected to said timing means for sending out a first signal when the pot time of the mixture has expired and for sending out a second signal when the mixture has reached a desired combination.

* * * * *